United States Patent
Brimshan

(10) Patent No.: US 9,094,513 B2
(45) Date of Patent: Jul. 28, 2015

(54) OUTBOUND PACING MECHANISM FOR IVR

(71) Applicant: CELLCO PARTNERSHIP, Basking Ridge, NJ (US)

(72) Inventor: Michael Brimshan, Old Bridge, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 13/973,519

(22) Filed: Aug. 22, 2013

(65) Prior Publication Data

US 2015/0055773 A1 Feb. 26, 2015

(51) Int. Cl.
*H04M 3/51* (2006.01)
*H04M 3/523* (2006.01)

(52) U.S. Cl.
CPC ............ *H04M 3/5166* (2013.01); *H04M 3/523* (2013.01); *H04M 3/5231* (2013.01)

(58) Field of Classification Search
CPC ... H04M 3/493; H04M 3/5166; H04M 3/523; H04M 3/5231
USPC .............................. 379/265.1, 266.07, 266.08
See application file for complete search history.

(56) References Cited

U.S. PATENT DOCUMENTS

| 7,062,020 | B1 * | 6/2006 | Pirasteh et al. ............ 379/88.18 |
| 7,804,953 | B1 * | 9/2010 | Antonios et al. ......... 379/266.08 |
| 8,917,859 | B1 * | 12/2014 | Brimshan et al. ........ 379/265.09 |
| 2003/0174830 | A1 * | 9/2003 | Boyer et al. ............. 379/265.02 |
| 2005/0002515 | A1 * | 1/2005 | Mewhinney et al. .... 379/266.08 |
| 2009/0168991 | A1 * | 7/2009 | Zgardovski et al. ..... 379/266.07 |
| 2012/0148036 | A1 | 6/2012 | Phelps et al. |
| 2012/0224681 | A1 | 9/2012 | Desai et al. |

* cited by examiner

*Primary Examiner* — Harry S Hong

(57) ABSTRACT

A pacing system and method for determining information related to a state of a call queue of an automatic call distributor (ACD). The information is based on a number of calls in the ACD queue waiting to be connected to a live agent. The pacing system and method controls a number of outbound calls being made by the IVR based system to a number of end users based on the information related to the ACD queue state.

20 Claims, 6 Drawing Sheets

US 9,094,513 B2

OUTBOUND PACING MECHANISM FOR IVR

BACKGROUND

Voice portals are used to answer calls and obtain information from callers. For example, businesses often use voice portals that include interactive voice response (IVR) systems to interact with callers and to obtain information from the callers. IVR systems may be used by businesses to make outgoing calls to customers and/or potential customers. An IVR system may be combined or associated with an automatic call distributor (ACD) or the like, so that under certain conditions of the IVR processing of a call, the call may be transferred to an available agent (e.g. customer service representative) of the enterprise. Current outbound IVR solutions do not implement a pacing solution based on real time network statistics. For example, current outbound IVR solutions are not paced to make efficient use of available ports and agents when placing outbound calls.

BRIEF DESCRIPTION OF THE DRAWINGS

The features of the subject technology are set forth in the appended claims. However, for purpose of explanation, several examples of the subject technology are set forth in the following figures.

DETAILED DESCRIPTION

Figure 1:
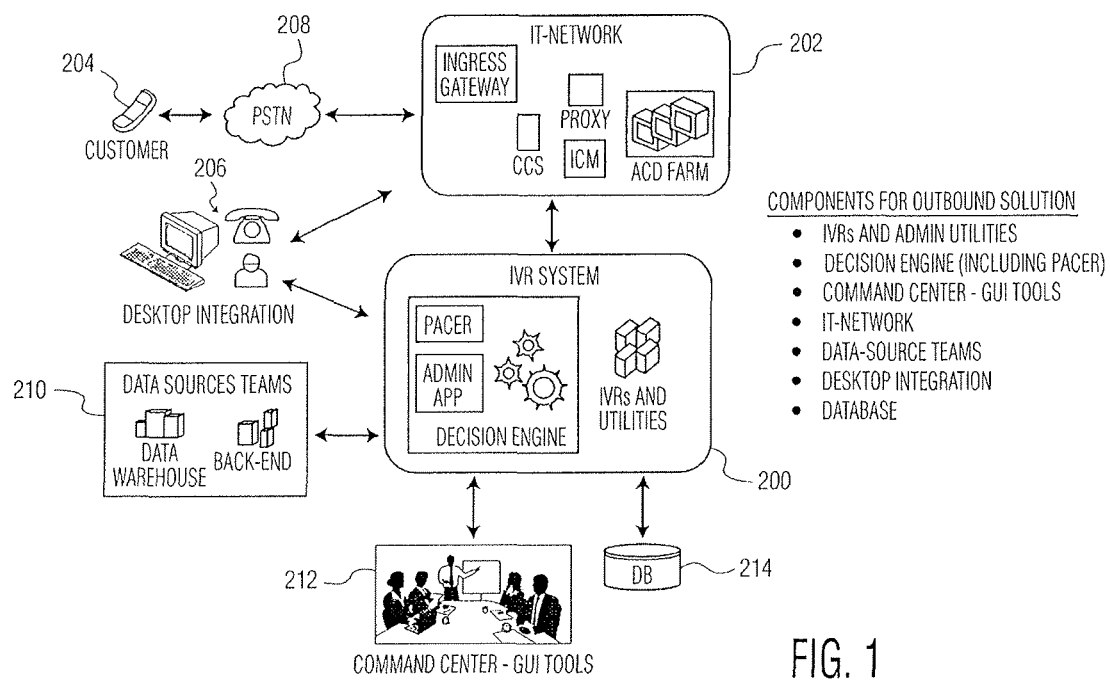
FIG. 1 shows a block diagram representing an example of an IVR system and other components including a pacer for an outbound solution, that might be used for example by or on behalf of a mobile communication service provider.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, should be clear and apparent to that the subject technology is not limited to the specific details set forth herein and may be practiced without these specific details. In some instances, well-known structures and components are shown in block diagram form in order to avoid obscuring the concepts of the subject technology.

IVR based systems can execute an outbound calling campaign involving calls to one or more called parties (e.g. customer(s) or prospective customer(s) of an enterprise). An outbound IVR calling campaign could be used, for example, where an enterprise wants to collect a debt from some number of the enterprise's existing customers. The campaign could instruct the IVR to place an outbound call to each callee having a past due account (e.g. the delinquent customer) and attempt to collect a payment from the customer automatically through voice prompts. The IVR could also connect the customer to a live agent, e.g. to complete a payment or other relevant transaction over the phone call.

In general, IVRs may execute outbound calls to customers. Being able to control, monitor and modify an IVR based system (i.e. a system including at least one IVR platform including IVR hardware) to perform outbound call campaigns is beneficial to certain enterprises attempting to execute specific customer based tasks.

For example, many customers owe past due balances on their customer accounts with enterprises (e.g. phone/internet providers). An enterprise would benefit if an IVR based system could be programmed to perform the task of automatically calling these customers and monitoring progress of the calls in an attempt to collect payments on the past due accounts.

In general, an outbound call campaign is a process where a number of specified end users (e.g. customers) are called by the automated IVR based system to accomplish a specific task (e.g. debt collection). The end users targeted by the campaign may be specified by at least one database that stores personal customer information (e.g. phone numbers, account balance, payment history, etc.). This database may be managed by the enterprise itself (e.g. internal databases with existing customer information), or provided by third parties that collects consumer information (e.g. data collection agencies). The campaign may also include a number of parameters such as preferred times of the day/week to call the end users, and a number of passes (i.e. the number of times to call the end users to accomplish the task). The campaign may also include an execution status of the task that indicates if the end users have actually connected to the IVR system (e.g. how many end users have paid the debt as a result of the campaign).

Assume an enterprise has 1,000 customers who owe on past due accounts. A campaign can be created by the enterprise to collect debts from these customers. The campaign may extract the phone numbers for customers 1-1,000 from the internal customer database. The campaign may then make calls to customers 1-1,000 attempting to connect the customers to the IVR based system and collect the outstanding debt. Assuming customers 1-1,000 are first time offenders, the campaign may allow the voice prompts of the IVR to automatically collect the debt without the use of a live agent. If customers 1-1,000 are repeat offenders, the campaign may force the customers to immediately connect with a live agent to resolve the debt. The campaign will place the outbound calls and repeat the calls if necessary (i.e. call multiple times until the customer is actually connected to the IVR system).

The results (e.g. if the customer connected to the IVR and/or if the customer paid the debt) of the campaign will be recorded by the IVR based system and displayed to administrators working for the enterprise. Based on the results, the administrators could program the IVR based system to modify the campaign (e.g. place additional calls more/less frequently, call new customers, call customers at different times, etc.). For example, if customers 1-499 pay their debts, and customers 501-1,000 do not, the campaign may be modified to place more frequent and aggressive calls to customers 501-1,000 in order to increase the likelihood/probability that these customer will be connected to the IVR based system, and the debt will be collected.

In general, the IVR based system could be controlled by the enterprise such that campaigns are created, monitored and modified if needed. In an example, a campaign includes automatically directing one or more outbound calls to one or more end users (i.e. customers) to perform one or more tasks (e.g. bill collecting). In an example, the campaign also includes monitoring the progress of outbound calls and controlling future outbound calls based on the results of past outbound calls (e.g. increasing the frequency of calls if the end user is not responding to the outbound calls) as determined through the monitoring. The IVR based system is controllable/configurable such that the enterprise can design campaigns to adequately meet its business needs.

Although bill or debt collection is used by way of an example at several points in the discussion, the IVR technologies under consideration here are readily adaptable to implementation of other types of calling campaigns to customers or other people and/or to attempting to have called parties perform a variety of different tasks. For example, the IVR technology may be used to call end users and collect personal information from those users (e.g. name, address, phone number, social security number, credit card number, etc.), advertise to potential customers, and solicit sales from potential customers including upgrading service and purchasing equipment.

Pacing is also a controllable feature of the outbound call solution. In general, pacing is the number of outbound calls being placed to the customers in a given time period. Controlling the pacing may be important to increase the likelihood of successfully executing a task (e.g. collecting a debt). For example, assuming all live agents are busy with existing customers, the pacing may be controlled to reduce the number of outbound calls being placed so that the ACD call queue (i.e. the queue where customers connected to the IVR based system are waiting for a live agent) does not get overcrowded and lead to long wait times for customers. In contrast, if there is a surplus of available agents, the pacing may be controlled to increase the number of outbound calls. In general, pacing may be controlled based on the number of ports available, the number of agents available, and the number of customers that need to be called by a campaign in order to optimize the IVR based system resources.

In some examples, it is beneficial to have a configurable controller (i.e. decision engine) for controlling, pacing and monitoring outbound calls of the IVR. In some examples, it is also beneficial for this decision engine to be centralized and easily configurable by various administrator users. Described below are examples of just such a decision engine.

Shown in FIG. 1 is a block diagram of outbound components for performing an outbound solution (i.e. pacing outgoing calls to customers to connect the customers to the IVR based system and execute a specific task). In this example, an end user customer 204 is a callee targeted by the IVR based system 200. The outbound components of the IVR based system communicate with such a customer via a voice communication network as generally represented by PSTN 208, although some or all of each call could be routed over a mobile network or via a voice-over-IP (VoIP) network or service. In this example, the outbound components include IT (information technology) network 202, IVR based system 200, data sources 210, command center 212, database 214, and desktop integration 206. In this example, the IVR based system 200 includes a decision engine, one or more IVRs and associated utilities and Pacer. In general, the decision engine of IVR based system 200 is able to control the outbound solutions for performing a task (e.g. collecting on a past due accounts) with customer 204. In some examples, the IVR based system receives data records from data sources 210 and instructions from the administrator via GUI 212. GUI 212 in one example is running on a desktop computer controlled by the enterprise (e.g. the business entity itself or a debt collection agency) that is attempting to collect the debt from the customer. In one example, the IVR based system stores results of outbound campaigns in database 214.

In one example, an enterprise, using GUI 212 (running on a desktop computer for an administrator or other representative of the enterprise) can obtain customer records (e.g. phone numbers and related records of debts owed) from data sources 210. The GUI may then be used to create a campaign to collect a debt from each selected customer. The decision engine runs the campaign, makes one or more calls and interacts with the person(s) answering the call(s) in one or more attempts to collect the debt from the customer. The decision engine monitors the progress and results of the campaign (e.g. whether the debt was collected or not). If the campaign is successful, the results can be displayed on GUI 212. If the campaign is not successful (i.e. the debt was not collected), then the decision engine can continue the campaign and call the customer again at a later time (i.e. the campaign may be modified, or the customer may be targeted by a different campaign). For example, the campaign may attempt to collect debt from a number of customers that are grouped together as first time offenders (e.g. customers who only missed one payment). Another campaign may attempt to collect debt from a number of customers that are grouped together as repeat offenders (e.g. customers who missed multiple payments). Customers may be grouped by other parameters other than payment history. Some of these grouping parameters include but are not limited to geography, amount of debt owed, elapsed time of default, etc.

For example, the calls can be monitored to determine if the customer was connected to an agent or not. If the agent collects the debt, the decision engine will be notified, and the decision engine may then remove the customer from the list so that no further calls are made to this customer. If the agent does not collect the debt, the decision engine will be notified, and the decision engine may remove this customer from the current campaign and include the customer in a more aggressive campaign where he is called more frequently. In general, different campaigns may be directed to different groups of customers (e.g. customers with small debts will be targeted by a passive campaign, whereas customers with large debts will be targeted by more aggressive campaigns).

The decision engine may also compute metrics such as statistical measures for monitoring the campaigns. These metrics may include but are not limited to number of calls connected to the IVR system, the average number of passes needed to connect a customer to the IVR system, etc. Furthermore, determining when and how many outgoing calls should be made (i.e. pacing) can be determined based on the number of ports available, the number of agents available, and the number of customers targeted by the campaign. In one example, an ACD queue state (i.e. the number of customers already in the ACD queue waiting for an agent) can be used to control the pacing of the outbound calls being made.

The enterprise can also modify the campaign parameters and monitor the campaign progress until the debt is successfully collected. Such a campaign and associated monitoring and adjustment can apply multiple times to any number of customers of the enterprise, and the GUI offers an interface for showing enterprise users aggregate results of such campaign calls to multiple individuals. The number of outbound calls and time of calls placed to one or more customers are just a few examples of the many factors that can be modified in the campaign in an attempt to increase the likelihood that the task will be completed (e.g. the debt will be successfully collected).

Figure 2:
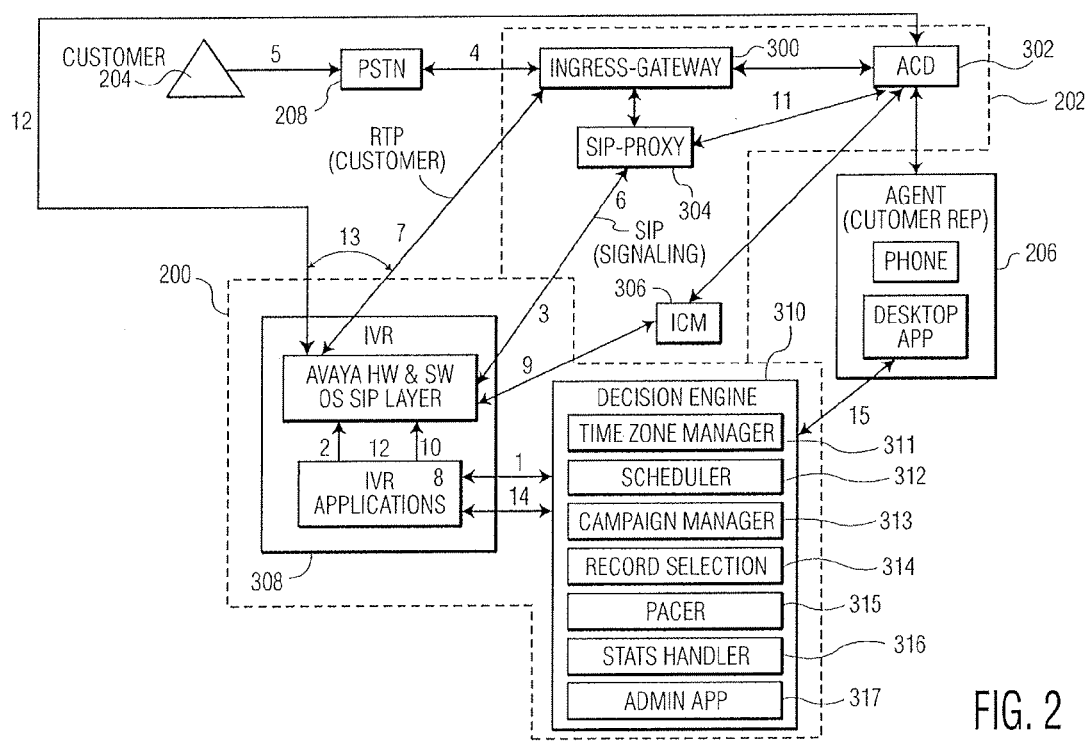
FIG. 2 shows an example of a network flow diagram of the IVR based system performing an outbound call to a customer.

A more detailed illustration of the outbound components of FIG. 1 is shown in the network flow diagram of FIG. 2 where IT network 202 includes an ingress-gateway 300, ACD 302 which distributes calls from the IVR to live agents, session initiation protocol (SIP) Proxy 304 and a contact manager which provides routing across the ACD and IVR systems. One example of such a contact manager is CISCO Intelligent Contact Management (ICM) 306. In FIG. 2, IVR based system 200 includes IVR 308 and decision engine 310 (including Pacer 315 and Administrative Application 317) which controls IVR 308 and other IVRs simultaneously. It is noted that the decision engine 310, the IVRs and IVR utilities are software programs being executed by at least one processor in system 200. The equipment for the data source teams, GUI and database can be located remotely from IVR based system 200 in their own computer/server devices. Communication between the various components in FIG. 2 is performed over a local or external network.

An example of a commercial IVR based system 200 is a Media Processing Server (MPS) from Avaya, such as the MPS 1000. The numbered lines between the blocks in FIG. 2 show the various communications between the different components. The various communications are numbered and are referenced in the flowchart of FIG. 3. In general, a campaign is created by personnel of the enterprise operating via the GUI on one or more terminal devices, typically, with interaction with server equipment running the appropriate application(s). Decision engine 310 (i.e. software running on a server) runs the campaign. IVR 308 then initiates an outbound call to each customer 204 identified for the campaign and attempts to accomplish a task such as collecting a debt from each called customer. The campaign may or may not connect customer 204 with a live agent 206, depending on the needs of the customer and the availability of live agents. In general the status of the campaign is reported back to decision engine 310 where a further decision regarding initiating further (i.e. future) calls to the customer or to other customers are made.

Figure 3:
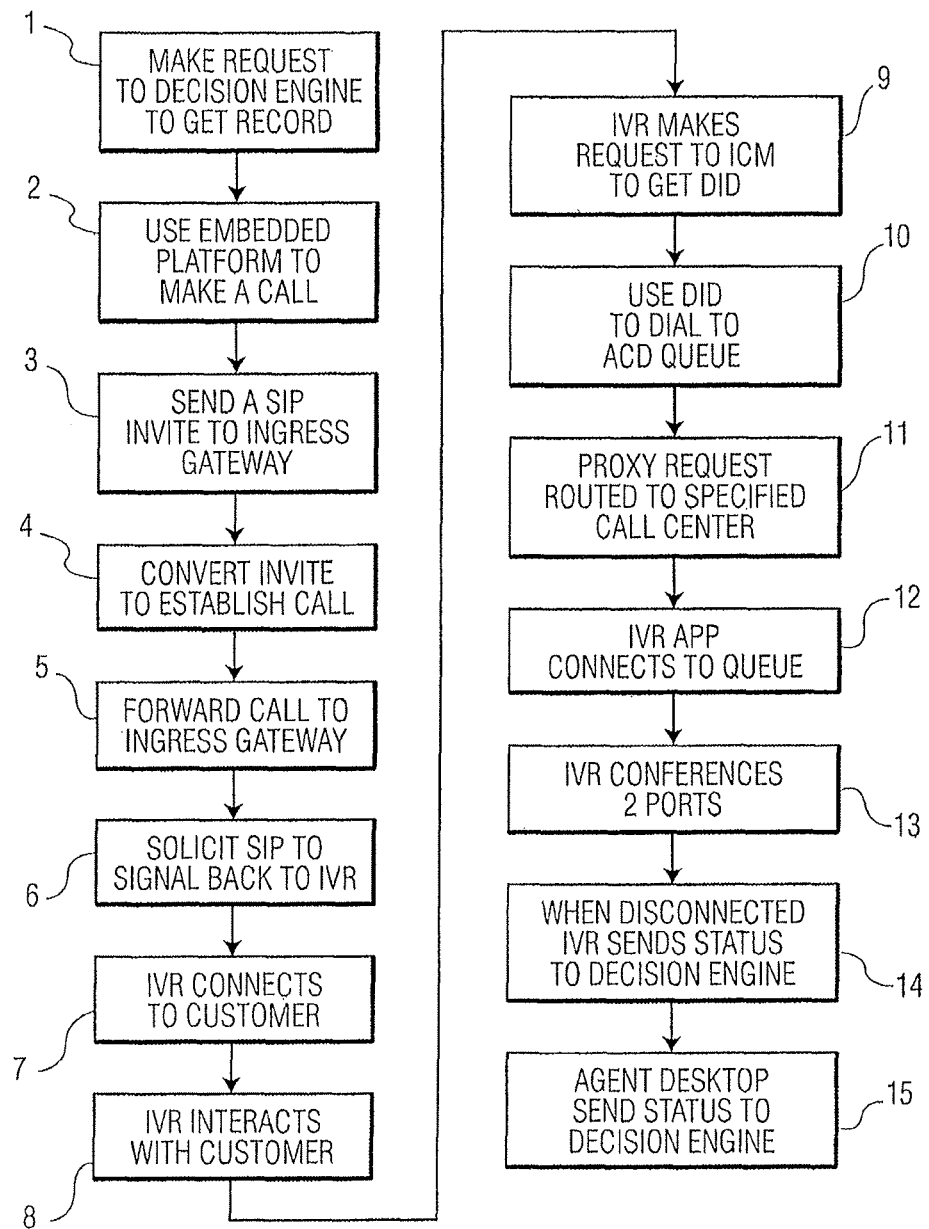
FIG. 3 is a flowchart showing exemplary steps performed by the IVR based system in FIG. 2.

Details of the communications between the various components of the outbound solution will now be described with respect to the flowchart in FIG. 3 with reference to the block diagram in FIG. 3. The flowchart in FIG. 3 shows an IVR initiated call to one customer. However, it is appreciated that the flowchart in FIG. 3 can be repeated multiple times for the same customer or other customers or to one or more other parties of interest to the particular enterprise running the outbound calling campaign. For a large enterprise seeking debt collection, for example, a calling campaign may entail one or more calls to one or more telephone devices of a large number of customers each of whom are past due on payment of monies owed to the enterprise.

In the illustrated example of a flow for one outbound call, in communication step 1, once a port is enabled, IVR 308 makes a request to decision engine 310 to obtain dialing records for a customer or other callee. It should be noted that the IVR in some examples is configured with 240 ports where each port can take an inbound call or make an outbound call. Typically, each port handles one call at a time. Some number of ports will be engaged in ongoing calls to or from the customers or other parties, and other ports will be engaged by calls directed through the ACD function to available agents. An enterprise will often want some number of ports held available for new inbound calls, so as to minimize or avoid blocking of inbound calls. However, such an arrangement or allocation of ports often leaves some number of the ports available for making new outbound calls from the particular IVR. Each outbound call proceeds based on a dialing record or instruction, in this example, obtained from decision engine 310.

Although other IVR based systems can use different bearer and related signaling protocols, the example assumes a VoIP technology using session initiation protocol (SIP) signaling for call set-up and the like. Hence, in communication 2, IVR 308 has an application layer that signals a SIP layer (i.e., an imbedded platform) to initiate an outbound call. In communication 3, IVR 308 sends a SIP invite message through the network to SIP-Proxy 304 which is then sent to ingress-gateway 300. In communication 4, ingress-gateway 300 converts the invite message received from the SIP-Proxy to a specific signaling protocol for a carrier in the PSTN. In this example, the carrier is AT&T 208. Thus, the invite message is converted to a time division multiplex signal to establish a call with customer 204. Once the connection is established between the customer and the carrier, in communication 5, the call is forwarded to ingress-gateway 300.

In communication 6, ingress-gateway 300 elicits SIP-Proxy 304 in order to signal back to the IVR 308 about the call. Once ingress-gateway 300 receives an acknowledgement from IVR 308, ingress-gateway 300 cuts the voice stream to IVR 308. This allows the IVR application to be connected with the customer 304 in communication 7. In communication 8, the IVR application and IVR 308 interact with customer 204 to validate that customer 204 is the correct party. In communication 9, if the customer 204 needs to be connected with a live agent (e.g., a customer representative), IVR 308 utilizes another port to make a request to ICM 306 via a GED 125 interface. The ICM 306 then replies back with the dialing number (DID). In one example, contact manager 306 is a call router.

The IVR 308 uses the DID number in order to dial to ACD 302 to distribute the current outbound call to a live agent if/when available. Where there are a number of calls being transferred to agents via the ACD 302, if all agents are engaged on earlier calls, new calls will be placed in an ACD agent ACD queue awaiting agents when the agents become available. Hence, in communication 10, a SIP invite message is sent to ACD queue 302. In communication 11, a SIP-Proxy request is routed to a specified call center queue in the ACD. In communication 12, the application in IVR 308 is connected to the ACD queue. In communication 13, IVR 308 conferences two ports, one with the customer and one with the agent. This allows the customer 204 to communicate with the live agent 206.

After the agent 206 and customer 204 are finished with their dealings (e.g. the customer is finished making a payment on their account balance), their call may be disconnected. A status of the disconnected call is then sent back to the decision engine 310. In communication 15, the live agent desktop application also sends status information back to the decision engine. Thus, decision engine 310 receives information regarding the results of the agent 206 dealing with customer 204 or multiple customers, and later uses this information for further campaigns (e.g. further outbound call attempts to collect money from past due accounts).

In general, the outbound solution described with reference to FIGS. 1 and 2 is one example of a live agent dealing with a customer. A common scenario may be an example where a past due customer account is managed by the system. In this example, the IVR based system receives a daily file that includes accounts from customers which are past due. Specific customer information is included in this file including customer name, contact numbers, address and past due amount, etc.

In one example, the decision engine 310 incorporates the customer records into campaigns that allow for prioritization and varied treatments for different customers. The decision engine 310 then runs the selected campaigns which attempt to complete a task with a customer (e.g. collect a debt from the customer). In one example, decision engine 310 causes an IVR to call a customer, the IVR provides the customer with a menu options geared to resolving their account balance delinquency, and the IVR transfers the customer through the ADC 302 to a live agent if necessary. The decision engine 310 then tracks the results of a given customer during the campaign.

In general, one or more customers can be contacted multiple times depending on results of the campaign. For example, if the decision engine sends an outbound call to a customer and receives a busy signal, then the decision engine will then attempt to contact the customer at a later point in time in a new campaign. The decision engine then creates a result file that is utilized to keep track of campaigns for certain customers. The decision engine continually monitors and manages the progress of campaigns in order to ensure that a particular task for a particular customer is achieved (i.e., collecting on past due accounts).

In general, decision engine 310 has a responsibility to process outbound campaigns that have been created, manage these campaigns and coordinate events based on particular business rules. In some examples, a decision engine includes internal components such as a time zone manager 311 which handles time zones for each campaign based on the residence of the particular customer. Also included in the decision engine is a scheduler 312 which manages when to stop and start campaigns. A campaign manager 313 which is also included in the decision engine keeps track of running campaigns, initiates port allocations and handles campaign updates via GUI 212.

Decision engine 310 also includes a record selection 314, a pacer 315, a stat handler 316, and administrative application 317. The record selection reads all records from a staging database 214 and applies campaign selection rules to obtain callable records for the customers for each campaign. The pacer is a process for agent based campaigns that decide when to increase and decrease dialing balance based on the number of live agents that are available and the existing number of calls already in ACD queue 302. The stats handler is a process that periodically collects summary progress and results data of the various campaigns. The administrative application continuously runs and obtains real-time data from the ACD queue. In operation, the decision engine handles requests from different external components such as the IVRs and utilities, the command center GUI 212, data sources 210 and desktop applications 206.

In some examples, the decision engine 310 receives at least the following four requests from IVRs and administrative utilities. First, a request is received for obtaining a customer's record for dialing. This is received from IVR 308. When a call is ready for transfer to an agent, a second request is received to obtain available agent port information which is associated with dialing ports. A third request is received to provide dialing status for particular customers. A fourth request would be for queue data (i.e. ACD queue state indicating the number of calls already in the queue waiting for live agents) that is provided to the pacer element. Other requests may also be received.

In some examples, the decision engine receives requests from the GUI such as requests to create campaigns, start, stop, pause and modify campaigns. The decision engine also receives requests from the GUI for current information of ongoing campaigns so that the information can be displayed to an administrator (e.g. a business entity or other enterprise) that is operating GUI 212. Other requests include requests from data sources that contain customer records that are notified to the decision engine and desktop applications where an event is sent to the decision engine with comments and status for the results of a particular campaign.

In general, the GUI 212 is a component for business entities (i.e., administrators relying on the IVR based system) in the call center. The GUI includes tools such as action items including soft buttons/switches, search windows, display windows selectable options, etc. that allow the administrator to interact and control the IVR based system. Using the GUI tools, authorized users are able to see real time views of campaigns, their progress and results. The authorized users are also able to create, modify, start, stop and pause the campaigns. The authorized users are also able to increase and decrease the pacing for agent based campaigns (i.e., increase or decrease the frequency of calls to a particular customer in order to perform a particular task). It is noted that multiple campaigns may be executed sequentially or simultaneously, and that each of these campaigns may have respectively similar or different pacing (e.g. a first campaign targeting customers with large debts may have a faster pacing than a second campaign targeting customers with smaller debts).

The IT network component 202 shown in FIG. 1 is a component that performs various tasks such as bringing outbound calls to customers, bringing calls to agents, providing ACD queue details for performing pacing and changing agent state from outbound type to inbound and vice versa. In some examples, the network includes various components such as an Ingress Gateway, CCS, ICM, Proxy Server and an ACD.

Figure 4:
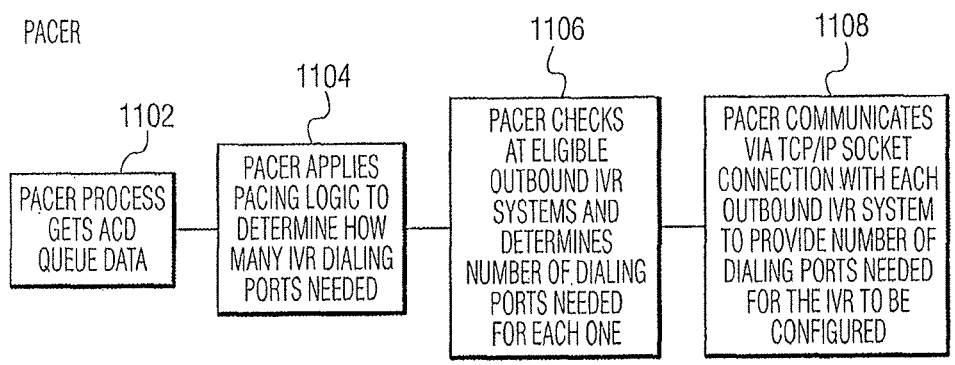
FIG. 4 is a flowchart showing exemplary steps for pacing the outbound calls.

An operation of the pacing mechanism (i.e. pacing system) in the decision engine is shown in the flowchart of FIG. 4. Specifically, step 1102 shows that the pacer obtains the queue data to determine various statistics such as the number of callers in the ACD queue, the number of agents that are busy, the number of agents that are available, etc. In step 1104, the pacer applies pacing logic to determine how many IVR dialing ports are needed for the campaigns. In step 1106, the pacer checks to determine how many ports are needed for the various campaigns. In step 1108, the pacer communicates to each outbound IVR based system to provide a number of dialing ports needed for IVR to be configured. An outcome of the flowchart in FIG. 4 is that the pacer determines how much dialing is needed based on agent availability. For example, if there are a large number of agents and relatively few customers in the ACD queue, then the decision engine may control the IVR based system to increase the number of outbound calls. However, in another example, if there are a low number of available agents and a large number of callers already in the ACD queue, then the decision engine may control the IVR based system to decrease the number of outbound calls. The number of outbound calls can also be determined in part based on whether the customer needs to interact with a live agent or can perform a particular task utilizing only the IVR based system. For example, if the IVR system can perform a task such as collecting a debt from a customer without using a live agent, the call can be placed even if there is a large number of existing customers in the ACD queue waiting for an agent (i.e. the new customer does not need an agent, and will not be added to the queue). In contrast, if the IVR system cannot perform the task such as collecting the debt from a customer without using a live agent (e.g. the customer is attempting to ignore the debt collection), the call may be delayed so that the queue is not increased (i.e. the wait time for talking to an agent is not increased beyond a threshold). The call to this customer can be made at a later time when the queue is not overloaded (i.e. when live agents are available).

In general, the pacing system includes three parts (pacer, administrative application and existing administrative application). The pacer is part of the overall outbound solution. In one example, the pacer may be a computer program that uses information from other components, and then based on an internal pacer logic (not shown) the pacing component applies rules to determine the number of ports needed to be dialed in the outbound solution. Subsets of the overall number of ports are then allocated and sent to each dialing IVR for control purposes.

In one example, the administrative application continuously runs and gets real time data from the ACD queue. The administrative application may include an initialization component that initializes the administrative application settings prior to obtaining the real time data. The administrative application in one example makes a request to a network call router ICM to request ACD queue data. The ACD queue data may include the total number of agents, the number of busy agents on phone calls with end users, the number of agents in idle state that are available and the number of calls that are already on hold in the queue.

The administrative application of the overall pacing system may also be in communication with the existing administrative application that runs on each IVR. The existing administrative application that runs on each IVR may need to be modified to handle requests to set up ports for outbound and inbound calls.

In general, the pacer retrieves the latest real time information regarding the ACD queue state from the administrative application. The pacer can retrieve this information periodically (e.g., every 15 seconds), or based on a triggered event manually defined by the administrator operating the GUI. Thus, the pacer will retrieve one of at least a total number of agents, the number of busy agents on calls on customers, the number of agents in the idle state waiting for calls to arrive and the number of calls in the queue (i.e., calls that are placed on hold when there are no available agents). Once the latest information is obtained by the pacer, then pacing logic calculates a number of ports for each outbound dialing IVR system, thereby performing efficient pacing.

Figure 5:
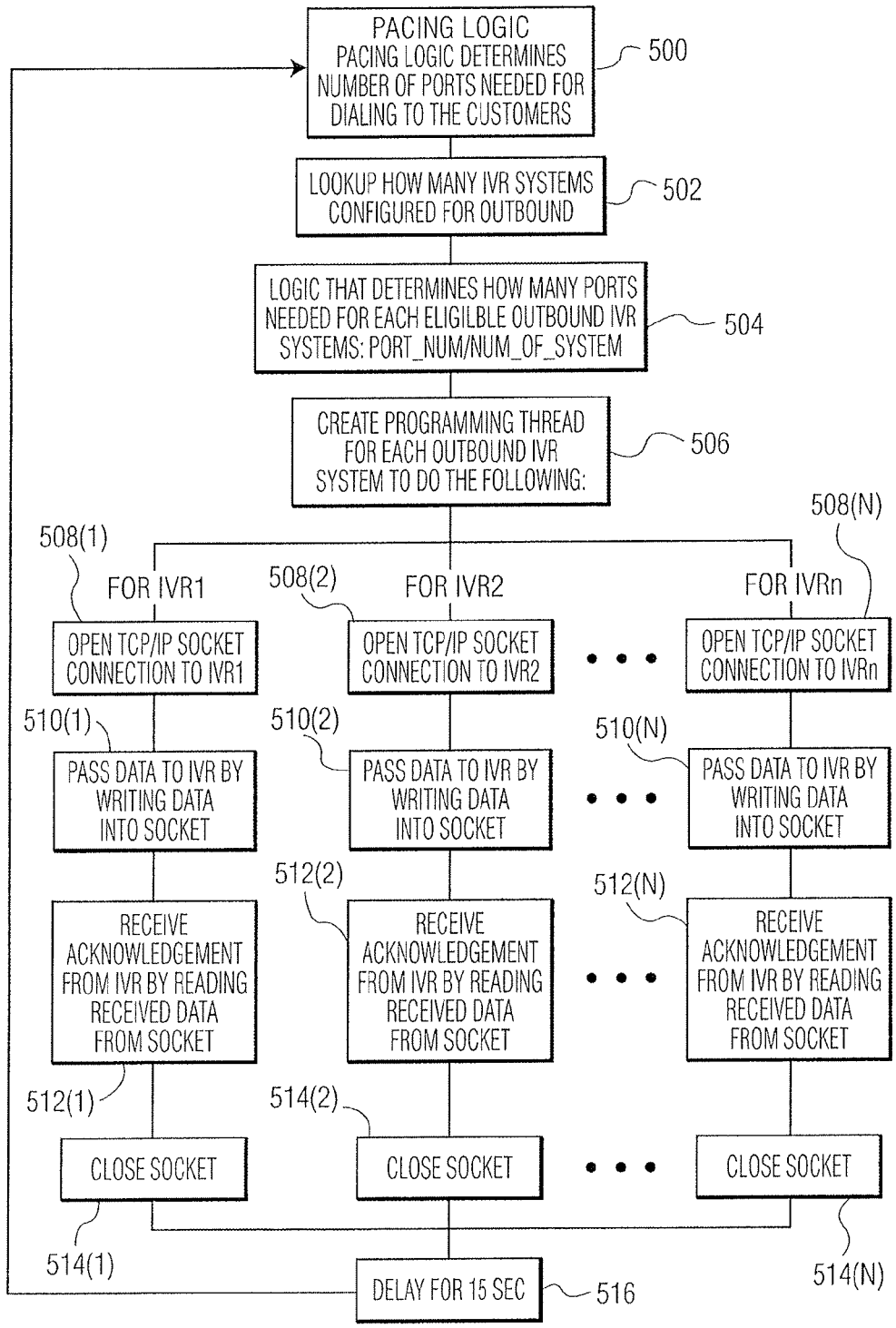
FIG. 5 is a flowchart showing exemplary steps of the overall pacing system.

A flowchart of the overall pacing system is shown in FIG. 5. In step 500 the pacing logic determines the number of ports needed for dialing customers. In step 502 the pacing system looks up the number of IVR systems that are to be configured for outbound calls. In step 504 the logic is applied for determining how many ports PORT_NUM are needed for each eligible outbound IVR system. Some of the parameters that are utilized include the port numbering number of systems NUM_OF_SYSTEM. In step 506 the pacing system creates a programming thread for each outbound IVR to perform a specific task and open an outbound port to perform an outbound call to an end user. In steps 508(1)-508(N) the pacing system opens TCP/IP sockets for connecting to the IVRs. In steps 510(1)-510(N) the pacing system passes data to the IVRs by writing data into the sockets. In steps 512(1)-512(N) the pacing system receives acknowledgements from each IVR by reading received data from the sockets. In steps 514(1)-514(N) the pacing system closes the open socket. In step 516 the pacing system delays for 15 seconds and then loops back to perform the pacing logic. Thus, the pacing system is able to retrieve the latest information and update the pacing logic every 15 seconds. It is noted that 15 seconds is just an example and other time periods may be utilized. It is also noted that the pacing system may also be updated based on the occurrence of a certain event.

Figure 6:
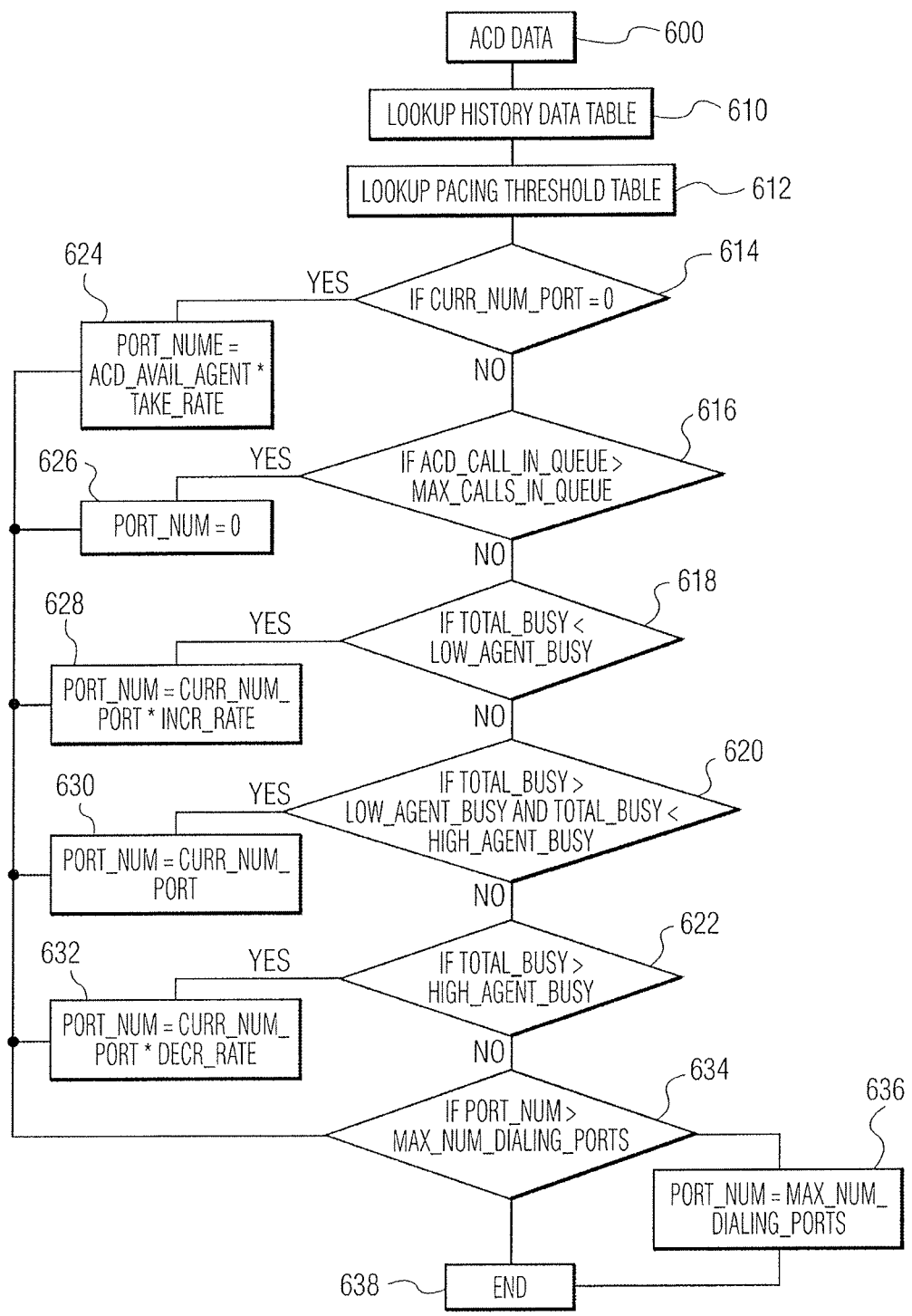
FIG. 6 is a flowchart showing exemplary steps for performing the pacing logic of the pacing system.

Using the information collected from the ACD, history data and thresholds, the pacer will apply the example logic that is shown in FIG. 6. In step 600 the pacing logic obtains the ACD data from the queue. The pacing logic may also obtain history data in step 610 (i.e., real time data and historical data may be utilized). In step 612 the pacing logic may lookup pacing logic tables which include thresholds such the ceiling threshold maximum of calls in the queue (i.e. MAX_CALLS_IN_QUEUE), the ratio (i.e., probability) for the connected call to be transferred to a live agent (i.e. IN_FLIGHT_PARAM), and the maximum number of ports configured for the outbound solution (i.e. MAX_NUM_DIALING_PORTS). The ACD data collected in step 600 may include the total number of agents in the system (i.e. ACD_TOTAL_NUM_AGENTS), the number of available agents that are not currently on calls (i.e. ACD_AVAIL_AGENTS), the number of agents that are already busy on calls with end users (i.e. ACD_BUSY_AGENTS) and the number of calls already in the ACD queue (i.e. ACD_CALLS_IN_QUEUE). The pacing logic may then use these ACD data and these thresholds from the table in order to perform the logic for the pacing system.

In step 614 the pacing logic determines if the current number of ports used for dialing customers (i.e. CURR_NUM_PORT) is equal to 0. If CURR_NUM_PORT is equal to 0, then the number of ports that need to be set based on the pacing logic (i.e. PORT_NUM) are set equal to ACD_AVAIL_AGENT*TAKE_RATE (i.e. number of needed ports to be dialed for every available agent). In general, the take rate is the probability that a call will result in a connection to a live customer (e.g., 30% take rate is equivalent to 3 out of every 10 calls connecting a live customer to the IVR system). If the value of CURR_NUM_PORT does not equal 0, then in step 616 another determination is made as to whether the ACD_CALL_IN_QUEUE>MAX_CALLS_IN_QUEUE. If step 616 produces a yes, then in step 626 the PORT_NUM is set equal to 0. If step 616 produces a no, then in step 618 another determination is made as to whether the calculated total number of busy agents (i.e. TOTAL_BUSY) is less than the pacing threshold that determines if agent utilization is too low (i.e. LOW_AGENT_BUSY). If step 618 produces a yes, then in step 628 the PORT_NUM is set equal to the CURR_NUM_PORT*the increase ratio to speed up dialing (i.e. INCR_RATE). If step 618 produces a no, then in step 620 another determination is made as to whether the TOTAL_BUSY is greater than LOW_AGENT_BUSY and if the TOTAL_BUSY is less than the HIGH_AGENT_BUSY which is the pacing threshold that determines if agent utilization is too high (i.e., a determination is made as to whether the total number of busy agents is above the minimum threshold and below the maximum threshold). If step 620 produces a yes, then in step 630 the PORT_NUM is set equal to the CURR_NUM_PORT. If step 620 produces a no, then another decision is made in step 622 as to whether the TOTAL_BUSY is greater than the HIGH_AGENT_BUSY. If step 622 produces a yes, then in step 632 the PORT_NUM is set equal to the CURR_NUM_PORT*DECR_RATE (i.e. decrease ratio when dialing is too fast). If step 622 produces a no, then another determination is made in step 634 as to whether PORT_NUM>MAX_NUM_DIALING_PORTS. If step 634 produces a yes, then in step 636 the PORT_NUM is set equal to MAX_NUM_DIALING PORTS. If step 634 produces a no, then in step 636 the process ends.

Essentially, the IVR based system allows a centralized component (i.e., a decision engine) to manage operations of the IVR based system and thereby manage outbound campaign solutions. The decision engine is also responsible for managing requests from components external to the IVR based system based on business rules and logic for particular businesses. The decision engine is easily configurable due to a GUI tool that allows administrators of a business to manage and monitor the various campaigns.

The various functions of the overall IVR based system shown in the figures (e.g. IVR, decision engine, desktop integration, computers or the like for the data source teams, command center, IVR utilities, ICM, ACD, etc.) and described above can be implemented in digital electronic circuitry, in computer software, firmware or hardware (e.g. microprocessor, ASIC, FPGA, RAM, ROM, etc.). The IVR outbound call pacing techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the IVR-related techniques for outbound call pacing as outlined in this disclosure may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into another computer platform that hosts and executes the pacing-related programming. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the IVR-related techniques discussed in this disclosure. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software inventions can be implemented as sub-parts of a larger program while remaining distinct software inventions. In some implementations, multiple software inventions can also be implemented as separate programs. Finally, any combination of separate programs that together implement software for pacing outbound calls from an IVR based system as described here is within the scope of the system and/or program product aspects of the pacing technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

The previous description is provided to enable any person skilled in the art to practice the various aspects described herein. Various modifications to these aspects will be readily apparent, and the generic principles defined herein may be applied to other aspects. Thus, the claims are not intended to be limited to the aspects shown or described by way of examples herein, but are to be accorded the full scope consistent with the claim language.

What is claimed is:

1. A pacing method comprising the steps of:
   determining, by an administrative application executed on a processor of an interactive voice response (IVR) based system, automatic call distributor (ACD) queue data stored in a memory device of the IVR based system, the ACD queue data related to a state of the ACD queue for each of a plurality of campaigns, the ACD queue data including a number of calls in the ACD queue (ACD_CALLS_IN_QUEUE) for each respective campaign waiting to be connected to a live agent through ports of the IVR based system;
   performing, by a pacer executed on the processor of the IVR based system, the steps of: 1) comparing the number of calls in the ACD queue (ACD_CALLS_IN_QUEUE) to a queue threshold, and 2) setting a number of ports (PORT_NUM) to be used for the outbound calls based at least in part on a result of the comparison in step 1 and not to exceed a maximum number of ports; and
   controlling separately for each respective campaign, by the pacer, a number of outbound calls being made through the ports of the IVR based system to a number of end user devices in each respective campaign based on the set number of ports (PORT_NUM).

2. The pacing method of claim 1, further comprising:
   determining, by the pacer, a number of ports to be used for dialing the outbound calls to the number of end users; and
   sending, by the pacer, the number of ports to the IVR to instruct the IVR to place the outbound calls.

3. The pacing method of claim 1, further comprising:
   retrieving, by the administrative application, the information related to the ACD queue state which includes at least one of a total number of agents, a number of busy agents on calls with end users, a number of agents in idle state waiting for a call from an end user, and a number of calls on hold in the queue for each respective campaign; and
   sending, by the administrative application, the information to the pacer.

4. The pacing method of claim 1, further comprising:
   controlling, by the pacer, a number of ports used for dialing the outbound calls to the number of end users based on an IN-FLIGHT parameter that indicates the number of end users connected to the IVR based system but not on hold in the queue, and a TAKE-RATE parameter that indicates a probability of an outbound call reaching an end user.

5. The pacing method of claim 1, further comprising:
   controlling, by the pacer, a number of ports used for dialing the outbound calls to the number of end users by comparing a sum of a number of busy agents and a number of end users connected to the IVR system but not connected to an agent, with a LOW-AGENT-BUSY threshold and a HIGH-AGENT-BUSY threshold greater than the LOW-AGENT-BUSY threshold.

6. The pacing method of claim 5, further comprising:
   incrementing the number of ports when the sum is less than the LOW-AGENT-BUSY threshold; and
   decrementing the number of ports when the sum is greater than the HIGH-AGENT-BUSY threshold.

7. The pacing method of claim 1, further comprising:
   sending, by a pacer, a request to at least one IVR of the IVR based system, including an identified port range for placing the outbound calls.

8. A decision engine of an interactive voice response (IVR) system, the decision engine comprising:
   a processor configured to execute:
      an administrative application for retrieving automatic call distributor (ACD) queue data stored in a memory device of the IVR system, the ACD queue data related to a state of the ACD queue for each of a plurality of outbound calling campaigns of the IVR system, the ACD queue data being based on a number of calls in the ACD queue (ACD_CALLS_IN_QUEUE) for each respective campaign waiting to be connected to a live agent through ports of the IVR system; and
      a pacer for receiving, from the administrative application, the ACD queue data for each respective campaign, the pacer to: 1) compare the number of calls in the ACD queue (ACD_CALLS_IN_QUEUE) to a threshold, 2) set a number of ports (PORT_NUM) to be used for the outbound calls based at least in part on a result of the comparison in step 1 and not to exceed a maximum number of ports, and 3) control a number of outbound calls being made through the ports of the IVR based system to a number of end user devices in each respective campaign based on the set number of ports (PORT_NUM).

9. The decision engine of claim 8,
   wherein the pacer determines a number of ports to be dialed, and sends the number of ports to the IVR to instruct the IVR to place the outbound calls.

10. The decision engine of claim 8,
    wherein the administrative application retrieves the information related to the ACD queue state including at least one of a total number of agents, a number of busy agents on calls with end users, a number of agents in idle state waiting for a call from an end user, and a number of calls on hold in the queue for each respective campaign.

11. The decision engine of claim 8,
    wherein the pacer controls a number of ports to be dialed based on an IN-FLIGHT parameter that indicates the number of end users connected to the IVR based system but not on hold in the queue, and a TAKE-RATE parameter that indicates a probability of an outbound call reaching an end user.

12. The decision engine of claim 8,
wherein the pacer controls a number of ports to be dialed by comparing a sum of a number of busy agents and a number of end users connected to the IVR system but not connected to an agent, with a LOW-AGENT-BUSY threshold and a HIGH-AGENT-BUSY threshold greater than the LOW-AGENT-BUSY threshold.

13. The decision engine of claim 12,
wherein the pacer increments the number of ports when the sum is less than the LOW-AGENT-BUSY threshold, and decrements the number of ports when the sum is greater than the HIGH-AGENT-BUSY threshold.

14. The decision engine of claim 8,
wherein the pacer sends a request to at least one IVR of the IVR based system, including an identified port range for placing the outbound calls.

15. A non-transitory computer readable medium having code stored thereon that causes a processor of an interactive voice response (IVR) system to execute:
an administrative application for retrieving automatic call distributor (ACD) queue data stored in a memory device of the IVR system, the ACD queue data related to a state of the ACD queue for each of a plurality of campaigns of the IVR system, the ACD queue data being based on a number of calls in the ACD queue (ACD_CALLS_IN_QUEUE) for each respective campaign waiting to be connected to a live agent through ports of the IVR system; and
a pacer for receiving, from the administrative application, the ACD queue data for each of the respective campaigns, the pacer to: 1) compare the number of calls in the ACD queue (ACD_CALLS_IN_QUEUE) to a threshold, 2) set a number of ports (PORT_NUM) to be used for the outbound calls based at least in part on a result of the comparison in step 1 and not to exceed a maximum number of ports, and 3) control a number of outbound calls being made through the ports of the IVR based system to a number of end user devices in each respective campaign based on the set number of ports (PORT_NUM).

16. The non-transitory computer readable medium of claim 15,
wherein the administrative application initializes settings prior to retrieving, in real time, the information related to the ACD queue state.

17. The non-transitory computer readable medium of claim 15,
wherein the retrieved information includes at least one of a total number of agents, a number of busy agents on calls with end users, a number of agents not on calls with end users, and a number of calls on hold in the queue for each respective campaign.

18. The non-transitory computer readable medium of claim 15,
wherein the administrative application retrieves the information related to the ACD queue state in real-time in response to an event manually defined by an administrator controlling the administrative application.

19. The non-transitory computer readable medium of claim 15,
wherein the administrative application retrieves the information related to the ACD queue state in real-time at a periodic interval.

20. The non-transitory computer readable medium of claim 15, including:
wherein the administrative application controls an existing administrative application that runs on at least one IVR of the IVR based system, such that the existing administrative application is able to set ports for the outbound calls.

* * * * *